United States Patent [19]
Schmid et al.

[11] 4,347,229
[45] * Aug. 31, 1982

[54] PROCESS FOR THE PYROGENIC PRODUCTION OF FINELY DIVIDED OXIDE OF A METAL AND/OR A METALLOID

[75] Inventors: Josef Schmid, Rheinfelden; Ludwig Lange, Bruhl; Hans Klebe; Dieter Schutte, both of Rheinfelden, all of Fed. Rep. of Germany

[73] Assignee: Degussa Aktiengesellschaft, Frankfurt am Main, Fed. Rep. of Germany

[*] Notice: The portion of the term of this patent subsequent to Mar. 24, 1998, has been disclaimed.

[21] Appl. No.: 156,082

[22] Filed: Jun. 3, 1980

[30] Foreign Application Priority Data

Jun. 8, 1979 [DE] Fed. Rep. of Germany ....... 2923182

[51] Int. Cl.$^3$ .................... C01B 33/113; C01F 7/02; C01G 23/047; C01G 17/02
[52] U.S. Cl. .................................. 423/336; 423/337; 423/592; 423/612; 423/613; 423/618; 423/625; 423/487
[58] Field of Search ............... 423/336, 337, 592, 609, 423/610, 612, 613, 618, 625, 487

[56] References Cited

U.S. PATENT DOCUMENTS 3,416,890 12/1968 Best et al. ..................... 423/618 X
4,258,023 3/1981 Schmid et al. .................... 423/336

FOREIGN PATENT DOCUMENTS 1194827 6/1965 Fed. Rep. of Germany ...... 423/592
2533925 2/1977 Fed. Rep. of Germany .
2849851 5/1980 Fed. Rep. of Germany .

Primary Examiner—Jack Cooper
Attorney, Agent, or Firm—Cushman, Darby & Cushman

[57] ABSTRACT

There is provided a pyrogenic process for the production of finely divided oxide of a metal and/or a metalloid in which there is employed as the starting material a vaporizable halogen compound of a metal and/or metalloid. Because of the starting material there is formed elemental halogen which is an impurity in the oxide formed. To remove the halogen there is supplied to the cooling section of the production plant a mixture of hydrogen and inert gas.

9 Claims, 1 Drawing Figure

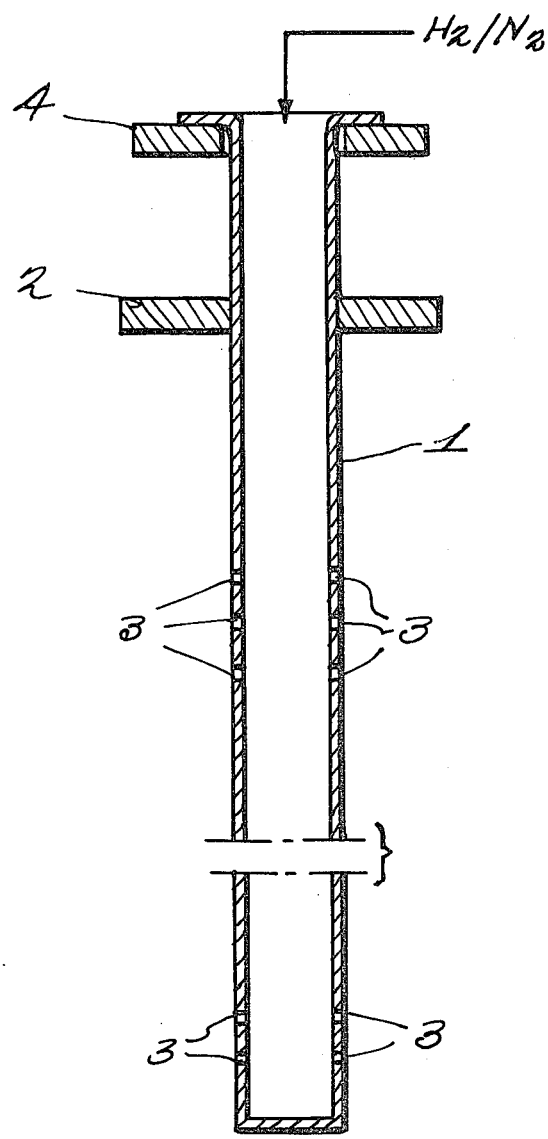

PROCESS FOR THE PYROGENIC PRODUCTION OF FINELY DIVIDED OXIDE OF A METAL AND/OR A METALLOID

BACKGROUND OF THE INVENTION

The invention is directed to a process for the pyrogenic production of a finely divided oxide of a metal and/or metalloid in which there is employed as the starting material a vaporizable halogen compound of a metal and/or metalloid and in which the elemental halogen formed as by product during the formation of the oxide of the metal and/or metalloid during the cooling of the reaction product is reacted with additionally supplied gaseous hydrogen below the reaction temperature of the oxyhydrogen gas mixture, consisting of the additionally supplied gaseous hydrogen and the oxygen contained in the reaction gases, to form hydrogen halide.

In the pyrogenic production of finely divided oxides of a metal and/or a metalloid there are supplied either separately or in admixture to a burned volatile or vaporizable compounds of the metal and/or metalloid together with combustible or water vapor forming gases.

In connection therewith the combustible gas and the oxygen containing gas are supplied in such a ratio that guarantees a complete burning of the combustible gas and also the hydrolysis of the vaporizable compound of the metal and/or metalloid.

If there are employed as starting materials inorganic or organic halogen compounds of the metals and/or metalloids then the metal oxide and/or metalloid oxide deposits together with a hydrogen halide containing waste gas which is separated off from the metal and/or metalloid oxide in appropriate separating apparatus. Elemental halogen is formed in a side reaction. According to the conditions for carrying on the reaction for the formation of the metal oxide and/or metalloid oxide there is formed, based on the amount of hydrogen halide formed 6 to 10 weight % of elemental halogen.

It is known to remove the elemental halogen, e.g. chlorine formed from the reaction waste gas in a pyrogenic process for production of oxides of a metal and/or metalloid if the elemental halogen formed is reduced with hydrogen during the cooling off of the reaction product below the reaction temperature of the hydrogen and with the oxygen contained in the reaction waste gas (GERMAN OS 2533925).

In this known process in which $SiCl_4$ (silicon tetrachloride) is used as the starting material for the production of silicon dioxide, the mixture formed of reaction waste gas and silicon dioxide passes through a temperature drop from 1000° to 200° C. within a relatively long cooling section during the cooling. The additional hydrogen is supplied in a region of the cooling section in which the reaction waste gas still has a temperature of 500° to 700° C. An addition of hydrogen at a temperature above 700° C. is not recommended since a reaction of the hydrogen with the oxygen already occurs in this case. The addition of the hydrogen at a temperature of below 500° C. likewise is not recommended since in this case the raction speed of the reaction of the hydrogen with the elemental chlorine is too slow.

The best results can be produced if the elemental hydrogen is introduced at a temperature between 550° and 630° C.

The exact point of introduction for the elemental hydrogen in the cooling section is load dependent, i.e. with production conditioned changes in flow velocity the place of introduction for the elemental hydrogen in the cooling section must be shifted.

A pipe is used for the introduction of the hydrogen, which pipe corresponds in its length to the diameter of the cooling section. This pipe has two series of bores in its jacket through which bores the hydrogen can be introduced into the reaction waste gases. A cross section of this type of introductory pipe is shown in the FIGURE of the present drawings.

The object of an older application in Germany according to P2849851 is the development of a process for the pyrogenic production of the finely divided oxide of a metal and/or metalloid in which there is employed as starting material a vaporizable halogen compound of a metal and/or metalloid in which the elemental halogen formed during the formation of the oxide of the metal and/or metalloid is reacted to halogen halide during the cooling of the reaction products with additionally introduced gaseous hydrogen below the reaction temperature of the oxyhydrogen gas mixture, consisting of the additionally introduced gaseous hydrogen and the oxygen contained in the reaction waste gas, in which gas the gaseous hydrogen is introduced by means of at least one double jacketed tube into the cooling section, in which case there is additionally led in by means of the same double jacket tube an inert gas which is supplied between the outer and inner jacket of the double jacketed tube, Schmid U.S. application Ser. No. 85,358 filed Oct. 16, 1979 corresponds to German application p2849851.

SUMMARY OF THE INVENTION

The object of the invention is the development of a process for the pyrogenic production of a finely divided oxide of a metal and/or metalloid in which there is employed as starting material a vaporizable halogen compound of a metal and/or metalloid and in which the elemental halogen formed during the formation of the oxide of the metal and/or metalloid the elemental halogen is reacted to form hydrogen halide during the cooling of the reaction product with additionally introduced gaseous hydrogen below the reaction temperature of the oxyhydrogen mixture, consisting of the additionally introduced gaseous hydrogen and the oxygen contained in the waste gases of the reaction which is characterized by introducing the gaseous hydrogen mixed with an inert gas and introducing it by means of a single pipe in the cooling section.

The amount of additional hydrogen is adjusted according to the reaction condition for the specific metal oxide or metalloid oxide to be produced. In such case so much hydrogen is added that in the finally obtained waste gas the amount of hydrogen contained is 1.6 to 2.0 volume %.

BRIEF DESCRIPTION OF THE DRAWING

The single FIGURE of the drawing is a sectional view, partially broken away, of an inlet tube or feed pipe with several openings which can be used in the process of the invention.

The addition of the hydrogen-inert gas mixture can take place over the entire cooling section at several places, e.g. 3 to 6 places, in which case a feed pipe is employed at each place.

In a preferred form of the invention the hydrogen-inert gas mixture is introduced into the cooling section at a temperature of 500° to 700° C., especially between 550° and 630° C.

As inert gas there can be used for example noble gases, e.g. argon, helium or neon, carbon dioxide or especially nitrogen. The inert gas can be employed in an amount of 20 to 200 m$^3$/h, preferably 50 to 150 m$^3$/h.

As starting material for the production of the metal oxide or metalloid oxide there can be used vaporizable halogen compounds of the metals aluminum or titanium or the metalloids (semi-metals) silicon or germanium. Illustrative starting compounds are silicon tetrachloride, silicon tetrafluoride, monobromosilane, difluorosilane, silicofluoroform, silicochloroform, monochlorosilane, monofluorosilane, germanium tetrachloride, germanium tetrafluoride, aluminum chloride, aluminum fluoride, aluminum bromide, titanium tetrachloride, titanium tetrafluoride.

For the production of mixed oxides of different elements there can be employed as starting materials a mixture of vaporizable halogen compounds of the corresponding elements.

In a preferred form of the invention there can be used as the starting material the halogen compound the corresponding chloride of the metal or metalloid. However, there can also be employed organic halogen compounds. Thus it is possible to use $SiHCl_3$, $SiCl_2H_2$, $SiCl_4$, $CH_3$—Si—$Cl_3$, $(CH_3)_2SiCl_2$, $(CH)_3$—Si—Cl, $CH_3CH_2$—$SiCl_3$ or $(CH_3CH_2)_2SiCl_2$ for the production of silicon dioxide.

Through the simultaneous addition of the inert gas with the hydrogen the temperature at the place of introduction can be influenced so that there can be avoided a shift of the place of introduction with changes in flow. Thus the introduction of the hydrogen-inert gas mixture can take place at a place at which the temperature of the reaction waste gas is so high that an immediate burning of the hydrogen with the oxygen would take place without this undesired burning occurring. Furthermore it is advantageous that the feed pipe for the hydrogen is cooled through the introduction of the inert gas and accordingly is able to be held longer and the corrosion can be suppressed. Through the introduction of inert gas additionally there is prevented the deposition of metal oxide or metalloid oxide on the inlet tube.

The process can comprise, consist essentially of or consist of the steps set forth with the stated materials.

The process of the invention will be made clearer in connection with the drawings.

DESCRIPTION OF THE PREFERRED EMBODIMENTS

The FIGURE illustrates a feed pipe for the hydrogen-inert gas mixture.

According to the FIGURE of the drawings the inlet tube 1 is so attached in the wall of the cooling section 2 that it corresponds with the length of the diameter of the cooling section. The inlet tube 1 has two series of bores 3 in the wall. The hydrogen-nitrogen-mixture is supplied via a line which is fastened at the flange 4 and flows through the bores 3 into the cooling zone.

There is hereby incorporated by reference the entire disclosure of German priority application P 2923182.1-41.

What is claimed is:

1. In a process for the production of a finely divided oxide of a metal or metalloid or mixture of a metal oxide and a metalloid oxide employing as starting materials (1) a vaporizable halogen compound of the metal, metalloid or mixture of metal and metalloidal halide, (2) an oxygen containing gas and (3) a combustible gas and in which the elemental halogen formed during the formation of the oxide of the metal or metalloid or mixture thereof from the burning of the combustible gas and the hydrolysis of the vaporizable halogen compound is reacted during the cooling of the reaction product with gaseous hydrogen introduced below reaction temperature of the oxyhydrogen gas mixture formed by mixing the gaseous hydrogen with oxygen containing waste gases to form hydrogen halide, the improvement comprising mixing the gaseous hydrogen with an inert gas and introducing the mixture into the cooling section through a single pipe into the waste gases containing halogen while the reaction product is cooled in the cooling section.

2. A process according to claim 1 wherein there is employed a halide of silicon, germanium, aluminum or titanium.

3. A process according to claim 2 wherein the halogen is chlorine.

4. A process according to claim 3 wherein the metal or metalloid is silicon.

5. A process according to claim 4 wherein the silicon is employed as $SiHCl_3$, $SiCl_2H_2$, $CH_3$—Si—$Cl_3$, $(CH_3)_2SiCl_2$, $(CH_3CH_2)_2$—Si $Cl_2$, $(CH_3)_3$—SiCl, $CH_3CH_2$—$SiCl_3$ or $SiCl_4$.

6. A process according to claim 5 wherein the inert gas is a noble gas, carbon dioxide or nitrogen.

7. A process according to claim 6 wherein the hydrogen-inert gas mixture is introduced into the cooling section at a temperature of 500° to 700° C.

8. A process according to claim 1 wherein the pipe has a plurality of openings and the mixture of hydrogen and inert gas is introduced into the cooling section through said plurality of openings.

9. A process according to claim 8 wherein the mixture of hydrogen and inert gas is introduced into the cooling section through 3 to 6 openings in the pipe.

* * * * *